May 27, 1969
W. BENZON
3,446,349
APPARATUS AND METHOD FOR SEPARATING AND RECOVERING RELATIVELY
COARSE MINERAL PARTICLES AND RELATIVELY FINE
MINERAL PARTICLES FROM A SLURRY
CONTAINING SAID PARTICLES
Filed March 16, 1966
Sheet 1 of 2
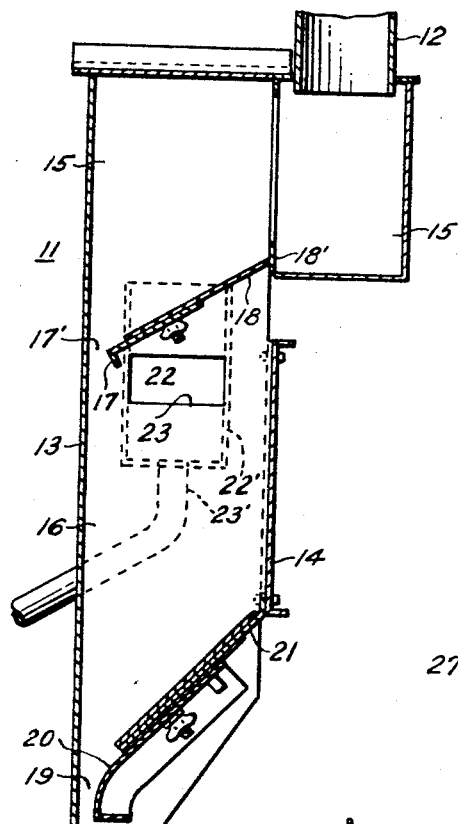
Fig. 1
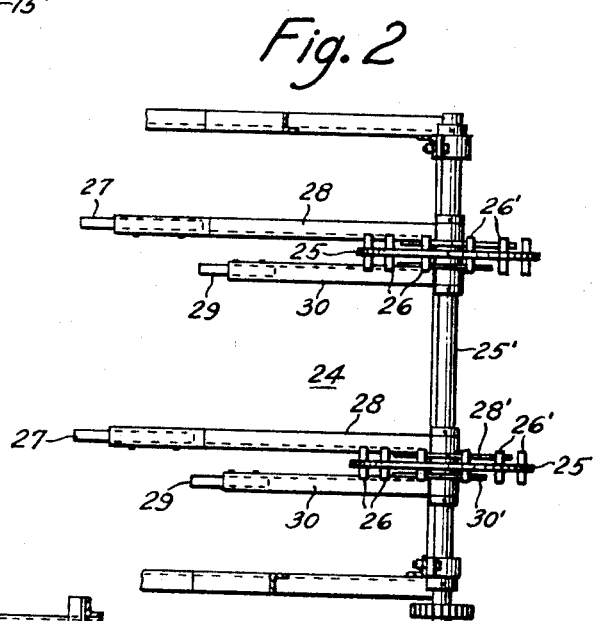
Fig. 2
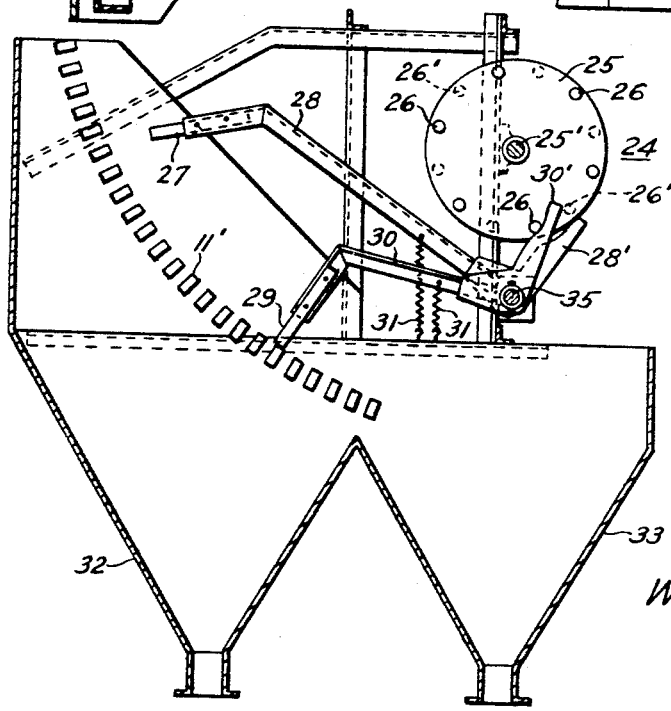
INVENTOR
William Benzon

United States Patent Office 3,446,349
Patented May 27, 1969

3,446,349
APPARATUS AND METHOD FOR SEPARATING AND RECOVERING RELATIVELY COARSE MINERAL PARTICLES AND RELATIVELY FINE MINERAL PARTICLES FROM A SLURRY CONTAINING SAID PARTICLES
William Benzon, Johnstown, Pa., assignor to Bethlehem Steel Corporation, a corporation of Delaware
Filed Mar. 16, 1966, Ser. No. 534,717
Int. Cl. B03b 7/00
U.S. Cl. 209—17                          4 Claims

ABSTRACT OF THE DISCLOSURE

Apparatus whereby relatively coarse mineral particles and relatively fine mineral particles may be separated and recovered from a slurry containing said mineral particles. The apparatus includes a sieve bend, means for delivering the slurry to the sieve bend and means for rapping the sieve bend at regularly timed intervals at spaced points along the width of the sieve bend. The means for delivering the slurry to the sieve bend includes a feed hopper, means for feeding the slurry to the hopper and means for controlling the height of the slurry in the hopper whereby a "static-head" is formed in the slurry to thereby feed the slurry at a desired velocity to the sieve bend. A method of separating the relatively coarse mineral particles and the relatively fine mineral particles from the slurry is also described.

---

This invention in general relates to the separation of solid mineral particles from a slurry and more particularly to improvements in the apparatus and method for effecting the separation of solid mineral particles of different sizes on a curved screen type apparatus.

The curved screen type of apparatus to which this invention relates is disclosed, for example, in U.S. Patent No. 2,916,142 issued Dec. 8, 1959 to F. J. Fontein and is known as, and will hereafter be referred to as a "sieve bend." The apparatus described therein is a fixed curved screen generally rectangular in shape, having the screening deck made up of parallel bars separated from each other a fixed distance to form apertures therebetween, and extending in a direction transverse to the flow of material to be separated. The fine wet mineral particles suspended in a fluid medium form a slurry which is fed from above generally tangentially to the concave surface of the curved screen. The apertures defined by the parallel bars of the curved deck engage succeeding layers of the slurry, removing water in layers of a depth substantially equal to one-fourth the width of the aperture. A solid mineral particle which is more than half immersed in the removed layer will be entrained and pass through the aperture. The biggest particle, therefore, that is removed in the layer of water has a diameter substantially twice the thickness of the removed layer and hence is substantially one-half the size of the aperture. By separating particles no more than one-half the size of the apertures, clogging or blinding of the curved screen is prevented.

Although sieve bends are designed to remove wet solid mineral particles from a wet slurry, screens having apertures smaller than about 0.35 mm. have not been used successfully. Therefore it has not been possible on sieve bends to separate from a slurry solid mineral particles finer than about 0.17 mm. in size. This limits the usefulness of sieve bends.

It is, therefore, an object of this invention to provide an improved sieve bend and method of operating the same which can remove from a slurry of mineral particles, particles larger than one-half the width of the apertures between the bars.

It is a further object of this invention to provide an improvement in apparatus for screening a slurry of fine wet mineral particles which makes it economically feasible to effect a separation of the fine wet mineral particles into relatively fine and relatively coarse fractions by the use of small apertured sieve bends.

It is a further object of this invention to provide an improved apparatus for supplying a slurry of mineral particles to a sieve bend.

Broadly, the invention is carried out by employing novel means for supplying a slurry of wet fine solid mineral particles to a sieve bend together with means for vibrating the sieve bend, whereby to enable the sieve bend to screen out particles larger than one-half the size of the said apertures.

FIG. 1 is a sectional elevation view of the sieve bend and attendant apparatus of this invention.

FIG. 2 is a plan view of the rapping device used to vibrate the sieve bend.

Figure 3:
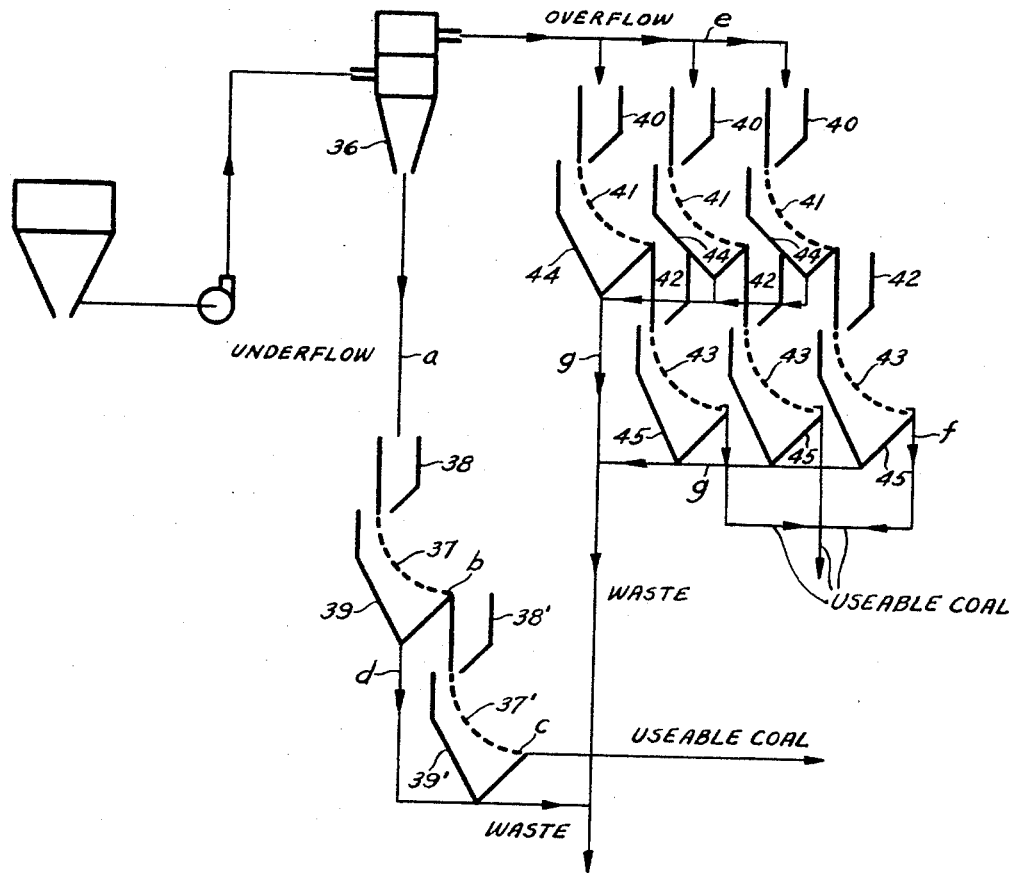
FIG. 3 is a schematic view of the circuit employed to recover usable coal in a specific embodiment of this invention.

The improved apparatus of the invention is shown in FIG. 1. The apparatus includes a feed hopper 11, an inlet pipe 12, a sieve bend 11', collecting bins 32 and 33 and a rapping device shown generally at 24.

The feed hopper 11 shown in FIG. 1 is a generally rectangularly shaped box having a front wall 13, a removable back wall 14 and side walls, an upper distribution chamber 15, a feed inlet chamber 15', and a lower discharge chamber 16. Said upper distribution chamber 15 is separated from the said lower discharge chamber 16 by adjustable baffle plate 17 and fixed plate 18. A first slot 17' is defined by the forward edge of baffle plate 17 and the front wall 13 of the hopper 11. A second slot 19 in the lower discharge chamber 16 is defined by the adjustable baffle plate 20 and the lower portion of the front wall 13, and a fixed plate 21 to which baffle plate 20 is attached. An overflow outlet 22 leading to overflow box 22' is provided in each of the side walls of the feed hopper 11, and a weir 23 is associated with each of the overflow outlets 22.

As shown in FIGS. 1 and 2, the rapping device includes a rotatable cam 25 mounted on and driven by shaft 25', activating pegs 26 and 26' inserted in said cam 25 in spaced relationship to each other, a striker 27 at the end of a first elongated arm 28 and a striker 29 at the end of a second arm 30, springs 31 associated with each arm 28 and 30 and a shaft 35 around which arms 28 and 30 may pivot.

It has been found that by intermittent rapping of the sieve bend at regularly timed intervals and at spaced points along the width of the screen, the dewatering capability of the sieve bend is improved. Since the removal of mineral particles from a slurry is dependent upon the dewatering capability of the sieve bend, it follows that an improvement in the dewatering capability of the said sieve bend will result in an increase in the portion of mineral particles which can be removed from the slurry.

Rapping the sieve bend also makes it possible to remove mineral particles larger than one-half the width of the apertures. The size of the mineral particles removed approaches the actual width of the aperture, without blinding the screen, therefore the efficiency of the sieve bend in removing mineral particles from a slurry is increased.

In addition, by the use of the rapping technique, it is possible to utilize sieve bends having apertures smaller than 0.35 mm. This extends greatly the field of usefulness of sieve bends in separating slurries of mineral particles in many industries.

It has also been found that the dewatering capability of the sieve bend, particularly the smaller apertured sieve bend, is affected by the manner of feeding the slurry to the sieve bend. To take full advantage of the dewatering capability of the sieve bend, it is necessary to feed the slurry uniformly across the entire width of the sieve bend, and at a velocity sufficient to prevent build-up of solid mineral particles at the discharge end of the sieve bend. The required minimum velocity of the slurry is obtained by employing a "static head" type of feed. As noted in FIG. 1, the feed hopper 11 is essentially a metallic box having side walls, a front wall 13 and a back wall 14. The inclined fixed baffle plate 18 extends across the width of the hopper 11 and is fixedly attached to the inside of the side walls and back wall 14 of the feed hopper, dividing the feed hopper 11 into an upper distribution chamber 15 and a lower discharge chamber 16. The slurry is introduced into the feed inlet chamber 15' by means of the feed pipe 12 in a manner so that it will fall onto the bottom of said feed inlet chamber and flow over the raised plate 18' into the upper distribution chamber 15. The impingement of the solid particles onto the bottom of said feed inlet chamber 15' results in keeping the slurry uniformly mixed thereby distributing the solid particles in the slurry evenly across the width of the hopper 11. The adjustable plate 17 attached to the inclined fixed baffle plate 18 may be moved to vary the width of the slot 17'. By varying the width of slot 17' more or less slurry may be allowed to pass from the upper distribution chamber 15 to the lower discharge chamber 16 to keep the proper height of slurry in the said lower discharge chamber 16. The width of the slot 19 in the lower discharge chamber 16 may be varied by moving the adjustable plate 20. Varying the width of the slot 19 regulates the amount of slurry which is fed to the sieve bend from the lower discharge chamber 16 of the hopper 11. The slurry overflow from the lower discharge chamber 16 passes through the overflow openings 22 into the overflow box 22'. The overflow openings 22 are provided in each of the side walls of the hoper 11 at a height above the slot 19 a sufficient distance so as to allow up to 4 feet of slurry depth to accumulate in the lower discharge chamber 16 of the hopper 11. A slight overflow of slurry through the overflow openings 22 is maintained at all times to assure a sufficient and constant height of slurry in the lower discharge chamber 16. The slurry which overflows through the openings 22 over the weir 23 into overflow box 22' may be returned to the upper distribution chamber 15 of the hopper 11 through the feed inlet chamber 15' or may be fed directly to the sieve bend by the pipe 23'.

Returning now to FIG. 1, as the slurry is fed to the sieve bend 11', the rapping device shown generally at 24 is utilized to vibrate the sieve bend. The cam 25 which may be activated by any well known means such as a motor (not shown) rotates at a preset speed. The pins 26 and 26' contact the extensions 28' and 30' of the rocker arms 28 and 30 causing the strikers 27 and 29 to be raised a distance above the sieve bend. When the cam 25 has rotated sufficiently to break contact between the rocker arms 28 and 30 and pins 26 and 26', springs 31 connected to the rocker arms 28 and 30 and to the supporting frame of the rapping device activate the rocker arms in a downward direction so that the strikers 27 and 29 contact the sieve bend thereby shaking the said sieve bend. As shown, there is one pair of strikers per cam. The strikers are mounted on rocker arms of differing lengths and positioned on either side of the cam 25 and acting independently of each other so that the sieve bend is rapped at spaced positions along the length of the face of the screen. A plurality of the rapping devices are spaced along the width of the sieve bend thereby causing a uniform intermittent vibration along the entire surface of the said sieve bend. Although we have shown the rapping device mounted so as to strike the face of the sieve bend the device may be mounted to strike the underside of the sieve bend thereby reducing splashing of the slurry as it is fed thereon.

The underflow, that is all solid particles and water which pass through the apertures in the sieve bend, is collected in the bin 32 and the overflow which passes over the sieve bend is collected in bin 33.

The use of the feed hopper and rapping device has made it possible to use sieve bends having apertures narrower than 0.35 mm. between the bars. Sieve bends having apertures 0.10 mm. in width have been used successfully. It will be understood however that the feed hopper and rapping device of the invention also may be used with sieve bends having apertures greater than 0.35 mm.

The uses and advantages of this invention will now be described specifically in connection with the preparation of coal.

In coal preparation plants it is usual to separate the fine sizes 28 x 0 mesh Tyler sieve size, into two fractions, —28, +100 and —100 x 0, in a hydrocyclone. The coarser particles, being of relatively high specific gravity, sink to the bottom of the hydrocyclone and constitute the underflow from the hydrocyclone. The finer particles on the other hand are relatively light and "float" in the water passing out of the hydrocyclone as the overflow. The finer coal particles which constitute the overflow contain less coal than the larger particles and are relatively high in sulfur and in ash content. The overflow, therefore, being relatively high in sulfur and ash forming constituents, is passed to waste, while the underflow which is relatively low in sulfur and ash forming constituents is reclaimable as usable coal. However, the overflow contains a certain amount of usable coal, which is thus wasted, and the underflow contains a certain amount of fine particles, high in sulfur and ash, which detracts from the value of the underflow.

By using the rapping technique and the feed hopper of the invention, it is possible to design and use a circuit to recover a percentage of the fine particles of coal which would normally be passed to waste. It is also possible to incorporate the hydrocyclone into the circuit. A schematic of the reclamation circuit is shown in FIG. 3.

The underflow $a$ from the hydrocyclone 36 containing about 50% solids is diluted with water to reduce the solids concentration to about 15% or lower. The diluted slurry is passed to a first feed hopper 38 which distributes the slurry uniformly across the width of the sieve bend 37. The diluted slurry is then subjected to particle separation on a series of rapped sieve bends 37 and 37' having apertures of 0.35 mm. Because of the static head maintained in the first feed hopper 38, the slurry has sufficient velocity to prevent build-up on the discharge end of the sieve bend 37. The overflow $b$ from sieve bend 37 is fed to a second feed hopper 38' which distributes the slurry uniformly across the width of the rapped sieve bend 37'. The overflow $c$ from sieve bend 37' is high quality usable coal having reduced sulfur and ash forming constitutents. The underflow $d$ from sieve bends 37 and 37' is collected in bins 39 and 39' respectively. Because the underflow $d$ from the sieve bends 37 and 37' is high in sulfur and ash forming constituents it is passed to waste. Of course, it is possible to utilize sieve bends having smaller apertures or to use a 0.35 mm. apertured sieve bend in series with smaller apertured sieve bends having apertures for example of 0.20 mm.

The overflow $e$ from the hydrocyclone 36 being relatively high in sulfur and ash forming constitutents is normally passed to waste. It has been found that by using the feed hopper of the invention and rapping the sieve bends, a portion of the overflow $e$ may be reclaimed by passing the slurry over sieve bends having small apertures, for example 0.10 mm. The overflow $e$ from the hydrocyclone 36 is passed to feed hoppers 40 arranged in parallel thence to three pairs of parallel rapped sieve bends 41 and 43. The overflow from the sieve bends 41 is passed to feed hoppers 42 and thence to rapped sieve bends 43.

The overflow f from the sieve bends 43 is relatively low in sulfur and ash forming constituents and is reclaimed as usable coal. The underflow g from sieve bends 41 and 43 collected in bins 44 and 45 respectively being relatively high in sulfur and ash forming constituents is passed to waste.

Although I have shown the overflow from the hydrocyclone 36 being fed to three pairs of parallel rapped sieve bends 41 and 43, it will be understood that any number of rapped sieve bends arranged in parallel may be used depending upon the volume of slurry to be treated. Here, too, it is possible to use smaller apertured sieve bends, e.g., sieve bends having apertures as small as .05 mm.

The following table shows the effect of rapping the 0.35 mm. apertured sieve bends and the 0.10 mm. apertured sieve bends:

|  | 0.35 mm. sieve bend | | 0.10 mm. sieve bend | |
| --- | --- | --- | --- | --- |
|  | Not rapped | Rapped | Not rapped | Rapped |
| Feed in gals. per minute per foot of screen width | 348.0 | 354.0 | 255 | 470 |
| Percent water removed | 84.4 | 94.0 | 5.5 | 92.1 |
| Percent solids overflow recovered | 83.1 | 72.9 | 97.9 | 30.6 |
| Percent sulfur content in: |  |  |  |  |
| Feed | 1.49 | 1.53 | 1.09 | 1.05 |
| Overflow | 1.06 | 1.00 | 1.08 | 0.83 |
| Underflow | 3.59 | 2.94 | 1.35 | 1.14 |
| Percent ash content in: |  |  |  |  |
| Feed | 6.46 | 6.17 | 8.29 | 7.10 |
| Overflow | 4.92 | 4.44 | 8.14 | 3.52 |
| Underflow | 14.08 | 10.83 | 15.14 | 8.54 |
| Percent slurry concentration in: |  |  |  |  |
| Feed | 9.1 | 8.5 | 7.36 | 5.9 |
| Overflow | 34.6 | 52.9 | 7.57 | 17.4 |
| Underflow | 1.9 | 2.6 | 3.27 | 2.9 |

The above tests on the 0.35 mm. sieve bend were run using the underflow from the hydrocyclone and diluting the said underflow with water to produce a slurry of 15% or lower solids which were fed to the sieve bends. The tests on the 0.10 mm. sieve bend were made using the overflow from the hydrocyclone. The volume of the slurry fed to the sieve bends was higher in both cases of the rapped sieve bends indicating a higher throughput of material is possible on the said rapped sieve bends. The water removal on the 0.10 mm. apertured non-rapped sieve bend was negligible, being only 5.5%, whereas the rapped sieve bend effected a 94.1% water removal. The water removal was also increased in the rapped 0.35 mm. apertured sieve bend, i.e., 94.0% compared to 84.4% removed on the non-rapped sieve bend. The increased water removal on the rapped sieve bends shows that rapping increases the dewatering capability of the said sieve bends. Although the solids recovery off the rapped 0.35 mm. apertured sieve bend was not quite as good as that off the non-rapped sieve bend, i.e., 72.9% compared to 83.1%, the removal of sulfur-bearing and ash forming constituents was greater and more efficient on the rapped sieve bend, indicating a higher quality of coal was recovered off the discharge end of the rapped sieve bend. The removal on the rapped 0.10 mm. apertured sieve bend was much better than on the non-rapped sieve bend. In both cases a significant reduction of ash content was obtained with the rapped sieve bends. It is apparent from the above data, that rapping improves the quality and quantity of usable coal recovered from the underflow and overflow slurry coming from the hydrocyclone.

While having thus described the invention in detail and with sufficient particularity as to enable those skilled in the art to practice it, it will be apparent that other adaptations and modifications may be made without departing from the scope of the claimed invention.

I claim:
1. Apparatus for screening a slurry of solid mineral particles to effect a separation of relatively coarse particles and relatively fine particles, said apparatus comprising a sieve bend, means for depositing said slurry onto said sieve bend across the entire width thereof under a static head at a velocity sufficient to prevent build-up of solid particles at the discharge end of the sieve bend and means for intermittently rapping the sieve bend.

2. Apparatus for screening a slurry of solid mineral particles to effect a separation of relatively coarse particles and relatively fine particles, said apparatus comprising a sieve bend, a hopper for depositing said slurry onto said sieve bend across the entire width thereof under a static head at a velocity sufficient to prevent build-up of solid particles at the discharge end of said sieve bend, said hopper having a baffle plate intermediate the top and bottom thereof dividing said hopper into an upper distribution chamber and a lower discharge chamber, an outlet at the bottom of said lower discharge chamber, means for controlling the height of said slurry in said lower discharge chamber, means for introducing said slurry into said upper distribution chamber of said hopper at a rate not lower than the rate of discharge of said slurry from said outlet, and means for intermittently rapping said sieve bend.

3. A method of separating a mixture of wet fine solid mineral particles, said method comprising delivering the said mixture of wet fine solid mineral particles to a hydrocyclone, passing a first feed comprising underflow from said hydrocyclone to a first feed hopper, maintaining a static head of said feed in said hopper, delivering said feed from said first feed hopper to a first sieve bend across the entire width thereof at a velocity sufficient to prevent build-up of solid particles at the discharge end of the sieve bend, intermittently rapping the said first sieve bend, passing a second feed comprising the overflow from said hydrocyclone to a second feed hopper, maintaining a static head of said feed, delivering the said second feed from the said second feed hopper to a second sieve bend across the entire width thereof and at a velocity sufficient to prevent build-up of solid particles at the discharge end of the second sieve bend and intermittently rapping the said second sieve bend.

4. Apparatus for depositing a slurry of solid mineral particles onto a screen therebelow comprising a hopper having an upper distribution chamber and a lower discharge chamber, an orifice of restricted size for feeding slurry by gravity from said upper distribution chamber into said lower discharge chamber, a discharge opening in the bottom of said lower discharge chamber and means for maintaining a constant height of slurry in the lower discharge chamber.

References Cited

UNITED STATES PATENTS

| | | | |
| --- | --- | --- | --- |
| 440,883 | 11/1890 | Noble | 209—347 |
| 557,172 | 3/1896 | Symons. | |
| 831,681 | 9/1906 | Cohenour et al. | 209—382 |
| 882,804 | 3/1908 | Suck | 209—246 |
| 952,562 | 3/1910 | Durst | 209—246 |
| 1,473,745 | 11/1923 | Stedman | 209—382 |
| 2,916,142 | 12/1959 | Fontein. | |
| 3,007,574 | 11/1961 | Koning | 209—281 X |
| 3,058,591 | 10/1962 | Nakahara | 209—273 |

FOREIGN PATENTS

| | | |
| --- | --- | --- |
| 203,430 | 6/1955 | Australia. |
| 469,241 | 11/1950 | Canada. |

OTHER REFERENCES

Fontein: "Curved Screen," Abstract of Gluckaut, vol. 91, No. 27–28, July 2, 1955, pp. 781–786.

TIM R. MILES, *Primary Examiner.*

U.S. Cl. X.R.

209—246, 273, 282, 382; 222—318, 564